US009622128B2

(12) United States Patent
Stojanovski et al.

(10) Patent No.: US 9,622,128 B2
(45) Date of Patent: Apr. 11, 2017

(54) SELECTING A SERVING GATEWAY

(71) Applicant: Apple Inc., Cupertino, CA (US)

(72) Inventors: Saso Stojanovski, Paris (FR); Barnaba Barnowski, Calgary (CA); Eric Parsons, Stittsville (CA); Gregory Osborne, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/494,983

(22) Filed: Sep. 24, 2014

(65) Prior Publication Data

US 2015/0011221 A1   Jan. 8, 2015

Related U.S. Application Data

(63) Continuation of application No. 13/318,931, filed as application No. PCT/CA2010/000678 on May 4, 2010, now Pat. No. 8,862,148.

(Continued)

(51) Int. Cl.
*H04W 36/08* (2009.01)
*H04W 48/00* (2009.01)
(Continued)

(52) U.S. Cl.
CPC ............. *H04W 36/08* (2013.01); *H04W 8/02* (2013.01); *H04W 36/0033* (2013.01);
(Continued)

(58) Field of Classification Search
CPC ....... H04W 8/02; H04W 36/36; H04W 36/09; H04J 11/0069
See application file for complete search history.

(56) References Cited

U.S. PATENT DOCUMENTS

2007/0243872 A1   10/2007   Gallagher et al.
2008/0214213 A1    9/2008   Etemad et al.
(Continued)

FOREIGN PATENT DOCUMENTS

CN      101309519       11/2008
JP      2010258881      11/2010
(Continued)

OTHER PUBLICATIONS

Supplementary Search Report, European Application No. 10771934.6, mailed Jun. 2, 2015, 8 pages.
(Continued)

*Primary Examiner* — Myron K Wyche
(74) *Attorney, Agent, or Firm* — Meyertons, Hood, Kivlin, Kowert & Goetzel, P.C.

(57) ABSTRACT

A system and method are provided for enabling a mobile device to establish a local IP access on a packet data network connection on a femto cellular access network. A local server gateway and a macro server gateway are coupled to the femto cellular access network. A mobility management entity is coupled to the femto cellular access network, the local server gateway and the macro server gateway. The mobility management entity obtains a status mode of the mobile device and a location of the mobile device transmitted on the femto cellular access network. The mobility management entity selects one of the local server gateway and the macro server gateway based on the status mode of the mobile device and the location of the mobile device.

20 Claims, 5 Drawing Sheets

Related U.S. Application Data

(60) Provisional application No. 61/175,169, filed on May 4, 2009.

(51) Int. Cl.

| | | |
|---|---|---|
| *H04W 8/02* | (2009.01) | |
| *H04W 36/00* | (2009.01) | |
| *H04W 4/02* | (2009.01) | |
| *H04W 8/08* | (2009.01) | |
| *H04W 74/00* | (2009.01) | |
| *H04W 80/04* | (2009.01) | |
| *H04W 84/04* | (2009.01) | |
| *H04W 88/16* | (2009.01) | |

(52) U.S. Cl.
CPC .............. *H04W 48/17* (2013.01); *H04W 4/02* (2013.01); *H04W 8/082* (2013.01); *H04W 74/00* (2013.01); *H04W 80/04* (2013.01); *H04W 84/045* (2013.01); *H04W 88/16* (2013.01)

(56) References Cited

U.S. PATENT DOCUMENTS

| | | | | |
|---|---|---|---|---|
| 2009/0156213 | A1* | 6/2009 | Spinelli | H04W 36/36 455/436 |
| 2009/0232019 | A1 | 9/2009 | Gupta et al. | |
| 2010/0150049 | A1* | 6/2010 | Kim | H04W 76/022 370/312 |
| 2010/0195622 | A1 | 8/2010 | Buchmayer et al. | |
| 2010/0240397 | A1* | 9/2010 | Buchmayer | H04J 11/0069 455/456.1 |
| 2011/0026463 | A1* | 2/2011 | Lair | H04W 76/041 370/328 |
| 2011/0038318 | A1 | 2/2011 | Parsons et al. | |

FOREIGN PATENT DOCUMENTS

| | | |
|---|---|---|
| WO | 2007129045 A1 | 11/2007 |
| WO | 2009045969 | 4/2009 |
| WO | 2009055827 | 4/2009 |
| WO | 2009132435 | 11/2009 |
| WO | 2010045302 | 4/2010 |

OTHER PUBLICATIONS

Qualcomm Europe: "Local IP access for EHNB", 3GPP Draft; S2-087493, 3rd Generation Partnership Project (3GPP), Mobile Competence Centre; 650, Route Des Lucioles; F-06921 Sophia-Antipolis Cedex; France, no. Miami; Nov. 12, 2008, Nov. 12, 2008, XP050331947, [retrieved on Nov. 12, 2008], p. 2, paragraph 2.3, p. 4, figures 6. x.2.2-2, p. 3, paragraph 6.x.2.1, p. 1, paragraph 1.
Nortel: "Local IP Access", 3GPP Draft; S2-092355_HENB_LOCALIP, 3rd Generation Partnership Project (3GPP), Mobile Competence Centre; 650, Route Des Lucioles; F-06921 Sophia-Antipolis Cedex; France, no. Hangzhou; Mar. 24, 2009, Mar. 24, 2009, XP050345639, [retrieved on Mar. 24, 2009], 5 pages.
Office Action, Canadian Application No. 2,779,231, mailed Jun. 3, 2015, 4 pages.
U.S. Appl. No. 13/318,931, filed Jan. 6, 2012, Saso Stojanovski.
Office Action from Chinese Application No. 201080019755.6, mailed Feb. 25, 2014, English and Chinese versions, pp. 1-27.
"3GPP TSG SA WG2 Meeting#72 to 82-092308", Qualcomm Europe, Apr. 3, 2009, pp. 1-6.
Office Action from Japanese Application No. 2012-508862, mailed Feb. 25, 2014, English and Japanese versions, pp. 1-8.
International Search Report and Written Opinion dated Aug. 4, 2010 for International Application Serial No. PCT/CA201 0/000678, International Filing Date: May 4, 2010 consisting of 9-pages.
Office Action from Chinese Application No. 201080019755.6, issued Aug. 4, 2014, English and Chinese applications, pp. 1-32.
"LTE Local Breakout for Home eNB" Notel, 3GPP TSG-RAN WG3 Meeting #62, Nov. 2008, pp. 1-4.
"Discussion on SGW Selection", 3GPP TSG CT WG4 Meeting #40, Aug. 2008, 1 page.
Office Action from Chinese Application No. 201080019755.6, issued Dec. 17, 2014, English and Chinese versions, pp. 1-22.
Notice of Allowance from Japanese Application No. 2012508862, mailed Oct. 22, 2014, English and Japanese versions, pp. 1-8.
3GPP TSG-RAN WG3 Meeting #60, "LTE Breakout for Home eNB", Nortel, May 2008, pp. 1-4.
Notice of Allowance from Korean Application No. 1020117026985, issued Mar. 26, 2015, Korean version, pp. 1-5.
Office Action, European Application No. 10771934.6, mailed Dec. 21, 2015, 5 pages.

* cited by examiner

SELECTING A SERVING GATEWAY

CROSS-REFERENCE TO RELATED APPLICATIONS

This application is a continuation of U.S. patent application Ser. No. 13/318,931, filed Jan. 6, 2012, entitled "SELECTING A SERVING GATEWAY," which is a Submission Under 35 U.S.C. §371 for U.S. National Stage Patent Application of International Application Number: PCT/CA2010/000678, filed May 4, 2010 entitled "OPTIMIZING A SERVING GATEWAY LOCATION IN A HOME EVOLVED NODE B WITH LOCAL IP ACCESS," which claims priority to U.S. Provisional Application Ser. No. 61/175,169, filed May 4, 2009, each of which are herein incorporated by reference in their entirety as though fully and completely set forth herein.

FIELD OF THE INVENTION

This invention relates to femto cell networks, and more particularly to a system and method of optimizing a server gateway location for home evolved Node-B ("eNB") devices having local Internet Protocol access.

BACKGROUND OF THE INVENTION

Wireless carriers employ cellular towers to establish large cells for wireless communications over vast physical areas, such as metropolitan or rural areas. The large cells or macro cells may cover areas of 1 km to 5 km in diameter. A cellular tower broadcasts wireless signals to and receives wireless signals from user equipment or mobile handsets that are located throughout the macro cells.

Various structures are located within the macro cell environment that obstruct, reflect or otherwise interfere with the wireless signals. For example, users typically attempt to use mobile devices inside structures such as homes and commercial establishments, among other structures. These structures may be constructed of high loss material, such as concrete or metal that block wireless signals from penetrating the structures. Reception within these structures is often poor and unreliable due to weak wireless signal strength. Poor reception is associated with inferior quality of service by the mobile user. Femto cells or micro cells are located within these high loss structures to route signal transmissions through existing broadband backhaul infrastructure to the macro network. Data may be transported wirelessly between the femto cells and the macro cells via a macro Serving Gateway ("SGW") and a local packet data network gateway ("PGW") using an S1-U interface. In this case, the data travels outside the femto cell to the macro SGW and back inside the femto cell to the local PGW. This is known a traffic tromboning and is undesirable because it adds latency to data communications.

What is desired are systems and methods of optimizing a Serving Gateway location associated with femto cells. It is also desired to have systems and methods of avoiding traffic tromboning on a S1-U interface and avoiding frequent Serving Gateway relocation between a home premises and a macro environment during interrupted coverage at the home premises.

SUMMARY OF THE INVENTION

The present invention advantageously provides a method and system for optimizing a location of the serving gateway on a local network or a macro network based on a status mode of the user equipment and a location of the user equipment. The invention provides a system for enabling a mobile device to establish IP access on a packet data network connection using a femto cellular access network. A femto cellular access network is provided and is communicatively coupled to a local server gateway and a macro server gateway. A mobility manager is communicatively coupled to the femto cellular access network and is in communication with the local server gateway and the macro server gateway. The mobility manager obtains a status mode of the mobile device and a location of the mobile device transmitted on the femto cellular access network. The mobility manager selects one of the local server gateway and the macro server gateway based on the status mode of the mobile device and the location of the mobile device.

According to another embodiment, the invention provides a system for enabling a mobile device that is coupled to a macro cellular network to establish an IP access on a packet data network connection using a femto cellular access network. The macro cellular access network is communicatively coupled to a local server gateway and a macro server gateway. A mobility manager is communicatively coupled to the macro cellular access network and is in communication with the local server gateway and the macro server gateway. The mobility manager obtains a status mode of the mobile device and a location of the mobile device transmitted on the macro cellular access network. The mobility manager selects one of the local server gateway and the macro server gateway based on the status mode of the mobile device and the location of the mobile device.

According to yet another embodiment, the invention provides a method of using a femto cell to establish IP access for a mobile device on a packet data network connection using one of a local server gateway and a macro server gateway. A mobility manager determines a status of the mobile device and determines a location of the mobile device. The mobility manager communicates with the local server gateway and the macro server gateway and selects one of the local server gateway and the macro server gateway based on the status of the mobile device and the location of the mobile device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
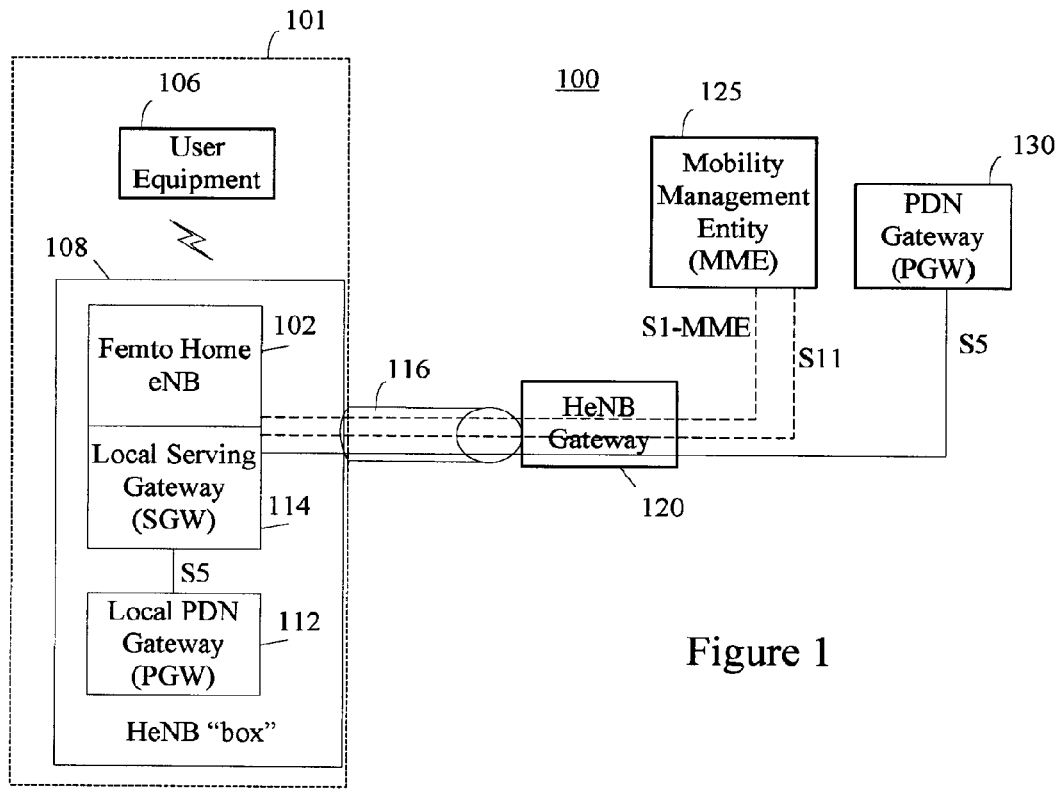
FIG. 1 illustrates a block diagram of an in-home local IP access network architecture having a local PDN connection and a local PGW, in accordance with the principles of the present invention.

As is shown in FIG. 1, the invention provides femto base stations or home evolved Node-B ("e-NB") devices 102 that are positioned inside structures 101 to improve cellular quality of service and to enable communications with devices coupled to a home network. For example, the femto base stations 102 may be positioned inside residential or commercial structures 101, among other structures. The femto base stations 102 may operate in the femto power range of about +15 dBm and may provide an operation range of approximately 50 meters. The invention also provides macro e-NBs 202 that are positioned within the macro cell, which is located outside the residential or commercial structures.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled" or "communicatively coupled," however, may also mean that two or more elements are not in direct contact with each other, but yet still co-operate or interact with each other. The embodiments disclosed herein are not necessarily limited in this context.

The femto base stations 102 and the macro e-NBs 202 communicate with user equipment ("UE") 106, such as cellular telephone, personal digital assistants, or other UE over wireless cellular technologies. The femto base stations 102 may use existing broadband backhaul infrastructure to access networks, such as the Internet and/or macro networks, through the publicly-switched telephone network. The femto base stations 102 may be communicatively coupled to digital subscriber line ("DSL") devices or cable modems and to local area networks ("LANs") 108.

The invention may operate using existing cellular technologies, such as CDMA2000 1×RTT, evolution-data optimized ("EV-DO") and long-term evolution ("LTE") networks, among other cellular networks.

The UE 106 may include a wide range of electronic devices, including but not limited to mobile phones, personal data assistants ("PDA") and similar devices, which use the various communication technologies such as advanced mobile phone system ("AMPS"), time division multiple access ("TDMA"), code division multiple access ("CDMA"), global system for mobile communications ("GSM"), general packet radio service ("GPRS"), 1× evolution-data optimized (abbreviated as "EV-DO" or "1×EV-DO") and universal mobile telecommunications system ("UNITS"). The UE 106 also includes hardware and software suitable to support the control plane functions needed to engage in wireless communication with the femto base stations 102 and the macro eNBs 202. Such hardware can include a receiver, transmitter, central processing unit, storage in the form of volatile and nonvolatile memory, and input/output devices, among other hardware.

The invention is directed to deploying a plurality of femto cells 102 within a macro cell or macro environment. While the various femto base stations 102 are components of the overall communications network, each femto cell is separate and distinct from the existing macro cell and any adjacent femto cells. During mobility, the system hands UE communication sessions from a femto cell 102 to the macro cell, or vice versa. Alternatively, the system may hand UE communication sessions from a femto cell to another femto cell.

According to one embodiment, the macro cells and the femto cells employ handoff procedures that are initiated for various reasons, including when signal strength measurements originating in the active network, such as the cellular network or the femto network, fall below pre-selected threshold parameters. The UE 106 may detect a weak signal strength emanating from the "active" access network and may initiate a handoff to the "idle" access network, such as the femto base station network or the cellular network, having a stronger signal strength. This may be performed by reporting the weak signal to the active access network.

Alternatively, the handoff procedures may be initiated to off-load terminal device traffic from the cellular network to the femto base station network. The femto base station 102 is a personal and dedicated base station for each corresponding structure, such as a home or commercial building 101. The femto base stations 102 independently support network traffic, along with the cellular network that supports the macro cell.

The femto base station 102 may be directly or indirectly coupled to a hub/switch, DSL/cable modem and/or a router (not shown). These devices may include separate hardware devices or a combination of hardware devices. The hub/switch and router may be provided to share system resources with the UE 106. Shared resources may include terminal devices, such as personal computers, laptops, printers, and media players, among other terminal devices.

The invention provides the femto base stations 102 having a local packet data network ("PDN") Gateway ("PGW") 112 with a home access point name ("APN") and a local Serving Gateway ("SGW") 114 that directs in-home data requests received through the local area network 108. A single APN may be assigned to a plurality of subscribers and may be resolved to a target local PGW 112. Alternatively, a plurality of APNs may be assigned to a plurality of subscribers.

The UE 106 is provided with local IP access on a dedicated packet data network ("PDN") connection. The PDN connections may include a local PDN connection, an external PDN connection or both local and external PDN connections. The UE 106 may be placed in one of two modes, an active mode and an idle mode. Depending on the type of local IP access and the state of the UE 106, it is desirable to optimize a location of a Serving Gateway (SGW) location, by selectively assigning the SGW location into a local environment or a macro environment. The invention provides several optimizations. For example, when the UE 106 is placed in idle mode while located in a local environment, a mobility management entity ("MME") or mobility manager may relocate the SGW to the macro environment. When the UE 106 is placed in active mode and is connected through a local PDN connections, the MME may relocate the SGW to the local environment to streamline data transport or avoid tromboning. When the UE 106 de-activates the local PDN connections while still engaged to an external PDN connection, the MME may relocate the SGW to the macro environment to eliminate frequent SGW relocations due to poor signal receptions.

Long-term evolution ("LTE") and evolved high rate packet data ("eHRPD") are exemplary fourth generation ("4G") technologies that improve the universal mobile telecommunications system ("UMTS") mobile telephone standard by providing a simplified, all-packet architecture. The UMTS technology supports mobile Internet protocol ("IP") services, such as music downloads, video sharing, voice over IP broadband access, and other IP services to laptops, personal digital assistants ("PDAs") and other user equipment 106. The LTE enhances current UMTS capabilities by providing improved efficiency, lower costs, increased peak data rates, lower latency, improved services and improved integration with other open standards. The invention further supports femto cellular access networks, including an LTE network, an EVDO or eHRPD network connected to an evolved packet core ("EPC"), WiMax 802.16e/m connected to EPC.

It should be appreciated that, although the invention is described with reference to the LTE network, the principles of the invention may be adapted by one of skill in the art to include other networks, such as WiMAX (IEEE 802.16) networks, other CDMA2000 networks and any other networks known in the art or later developed.

Referring now to the drawing figures in which like reference designators refer to like elements, FIG. 1 illustrates an exemplary block diagram of a system designated generally as "100" that provides a local packet data network connection and includes UE 106 that communicates on a local area network 108 within a femto cell located inside a structure 101. The UE 106 may be assigned a local area IP address. The femto base station 102 includes a local packet data network ("PDN") Gateway ("PGW") 112 having a home access point name ("APN") and a local Serving Gateway ("SGW") 114 that routes in-cell data requests to an in-home LAN 108. The 'home-based' PDN or local PGW 112 permits the UE 106 to communicate over the local area network 108.

The local PGW 112 provides the UE 106 with direct connectivity to the backhaul IP infrastructure using the femto base station 102 and the home LAN 108. The local PGW 112 and the local SGW 114 eliminate the need to send data from the UE 106 across to an operator's macro network. Rather, Internet traffic may be re-routed from a service provider's wireless network to the backhaul IP infrastructure. The femto base station 102, the local PGW 112 and the local SGW 114 may be configured to enable the UE 106 to access one or more packet data networks ("PDN") concurrently through one or more local PGWs 112.

To support this capability, in addition to supporting a home or local SGW 114 and local PGW 112, the femto base station 102 supports the S5 and S11 interface, among other interfaces. The local PGW 112 and the local SGW 114 communicate using the S5 interface. The femto gateway ("HeNB GW") 120, in addition to aggregating the S1-MME interface, also may be enhanced to support S11 and S5 aggregation.

The femto base stations 102 may include a central processing unit ("CPU"), transmitter, receiver, I/O devices and storage, such as volatile and nonvolatile memory, to implement the functions described herein. The femto base stations 102 may communicate with the UE 106 over a radio interface.

The femto base station 102 may be coupled to the HeNB GW 120 through IPsec tunnel 116. IPsec tunnel 116 provides a secure public network connection and prevents wiretapping, traffic manipulation or other security threats. The HeNB GW 120 is an interface to external networks and may be coupled to a plurality of femto base stations 102. For example, the HeNB GW 120 may be coupled to and may manage hundreds or thousands of femto base stations 102. Additionally, the HeNB GW 120 may be configured as an authenticator that grants local breakout authorization.

According to one embodiment, a mobility management entity ("MME") 125 may be provided as a control plane entity to manage the UE 106 within the LTE network and to authenticate the UE 106. The MME 125 may be coupled to the femto base station 102 and the local SGW 114. The MME 125 is a signaling only entity, such that IP data packets that originate from the UE 106 are not processed at the MME 125. The MME 125 may perform various functions, including non-access stratum ("NAS") signaling; NAS signaling security; tracking area list management for mobile terminals in idle and active mode; packet data network gateway ("PDN-GW") selection and Serving Gateway ("S-GW") selection; roaming; authentication; and bearer management functions; among other functions.

The local GW or HeNB GW 120 communicates with packet data network gateway ("PDN GW") or ("PGW") 130. The communication may be performed using an S5 reference point, among other interfaces. PGW 130 provides the UE 106 with access to one or more PDN concurrently through one or more PGWs 130. The PGW 130 provides an anchor point for the UE 106 and remains in communication with the UE 106 throughout a communication session, regardless of whether the UE 106 moves to different network nodes. The PGW 130 is configured not to receive data that is transmitted using the femto base station 102 between the UE 106 and any in-home network devices. External Internet traffic may be routed to the in-home network devices through the in-home or local PGW 112 or the PGW 130, based on operator decision. The PGW 130 may perform various functions, including packet filtering on a per-user basis; interception; mobile terminal IP address allocation, uplink ("UL") and downlink ("DL") service level charging, gating and rate enforcement, and transport level packet marking in the downlink, among performing other functions. As used herein, "uplink" refers to communications from UE 106 and "downlink" refers to communications to UE 106. Additionally, the PGW 130 may manage mobility between 4G networks and non-4G networks.

Figure 2:
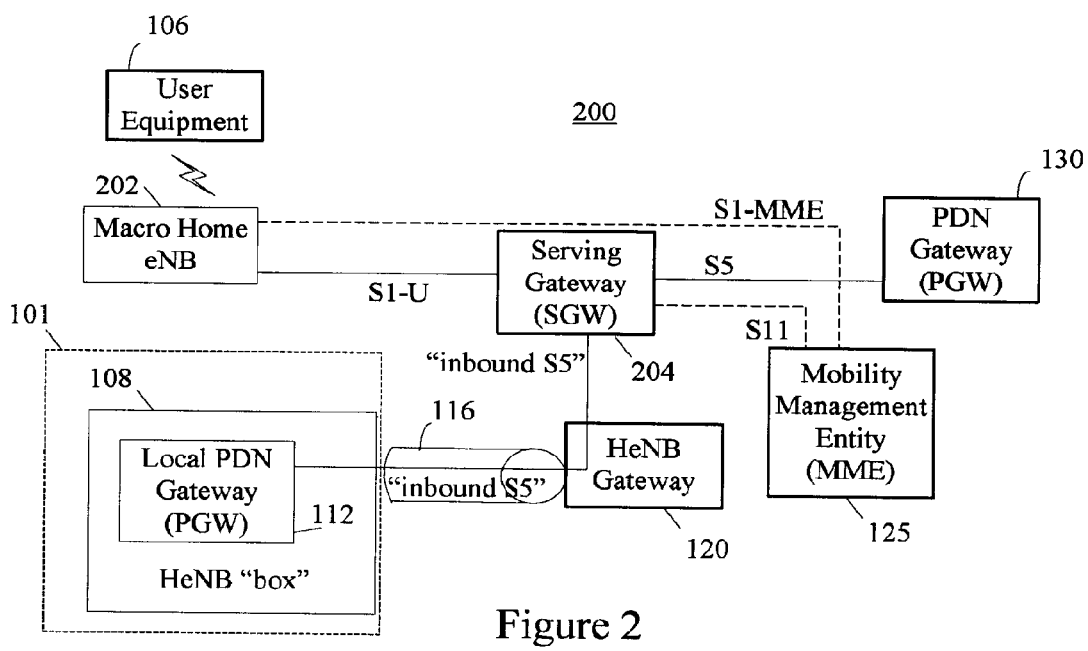
FIG. 2 is a block diagram of an away-from-home remote access architecture having an external PDN connection and a local PGW, in accordance with the principles of the present invention.

FIG. 2 is a schematic block diagram of a system designated generally as "200," for providing an external packet data network connection and enabling the UE 106, which is located at a remote location outside of a femto cell range, to communicate with the in-home LAN 108. In other words, the system 200 enables a remote UE 106 that is connected to the macro network to access the in-home LAN 108. The external PDN connectivity enables the UE 106 to specify an internal or in-home PDN as a target PDN. The macro network includes a Serving Gateway ("SGW") 204 that creates an S5 tunnel or "inbound" S5 interface to the in-home PDN via the HeNB GW 120, the IPsec 116 and the local PGW 112. The PGW 112 provides the remote UE 106 with access to the local network 108.

The S5 tunnel or "inbound" S5 interface provides a communication path from the SGW 204 to the HeNB GW 120 in order to facilitate routing of a request to the local PGW 112. The UE 106 communicates with the macro e-NB 202 in the macro network, where the UE 106 may be authenticated and data packets are forwarded to the SGW 204. The SGW 204 analyzes the data packets from the UE 106 and determines whether to direct the received data packets to the local PGW 112 through the HeNB GW 120. The UE 106 may acquire an IP address for itself on both the remote network and the local or home-based network 108 through, for example, a dynamic host configuration protocol ("DHCP") or another address management protocol. The HeNB GW 120 may direct the data packets to the local PGW 112. The local PGW 112 may send the data packets to the in-home LAN 108.

The SGW 204 may perform various functions, including being a local mobility anchor point for inter-eNB handoffs; mobility anchoring for inter-4G mobility; interception; packet routing and forwarding; transport level packet marking in the uplink and downlink; uplink and downlink per mobile terminal, PDN and quality of service class identifier ("QCI"); and accounting on user and QCI granularity for inter-operator charging; among performing other functions.

According to one embodiment, the MME 125 may be provided as a control plane entity to manage the UE 106 within the LTE network and to authenticate the UE 106. The MME 125 may be coupled to the macro e-NB 202 and the SGW 204. The MME 125 may manage packet forwarding uplink and downlink between the PGW 130 and the macro e-NB 202, among performing other functions. The MME 125 is a signaling only entity, such that IP data packets that originate from the UE 106 are not processed at the MME 125. The MME 125 may perform various functions, including non-access stratum ("NAS") signaling, NAS signaling security, tracking area list management for mobile terminals in idle and active mode, packet data network gateway ("PDN-GW") selection and Serving Gateway ("S-GW") selection, roaming, authentication, and bearer management functions among other functions.

An IP multimedia subsystem core (not shown) may be coupled to the PGW 130 to handle calls or sessions, real-time session negotiation and management. A home subscriber server (not shown) may be coupled to the MME 125 to maintain a physical location of the user. The HSS may be implemented with a master database having subscription and location information.

Together, the systems illustrated in FIGS. 1 and 2 provide the UE 106 with both a local PDN connection in system 100 and an external PDN connection in system 200. When the UE 106 operates in an active mode using a local PDN connection within range of the in-home LAN 108, a desired location for the Serving Gateway is within the in-home LAN 108 at local SGW 114, as illustrated in FIG. 1. By locating the Serving Gateway at local SGW 114 under these conditions, the invention streamlines data transport and avoids traffic tromboning on the S1-U interface between the femto base station 102 and the SGW 204. By contrast, when the UE 106 operates in an active mode using an external PDN connection in the macro environment, a desired location for the Serving Gateway is within the macro cell at SGW 204, as illustrated in FIG. 2. If the UE 106 transitions from the in-home LAN 108 to the macro environment (or vice versa) while the UE 106 is operating in active mode, the SGW relocation may be performed using existing 3GPP procedures. Otherwise, if the UE 106 transitions from the in-home LAN 108 to the macro environment (or vice versa) while the UE 106 is operating in idle mode, conventional systems maintain the SGW in the environment where the UE 106 was active last.

Figure 3:
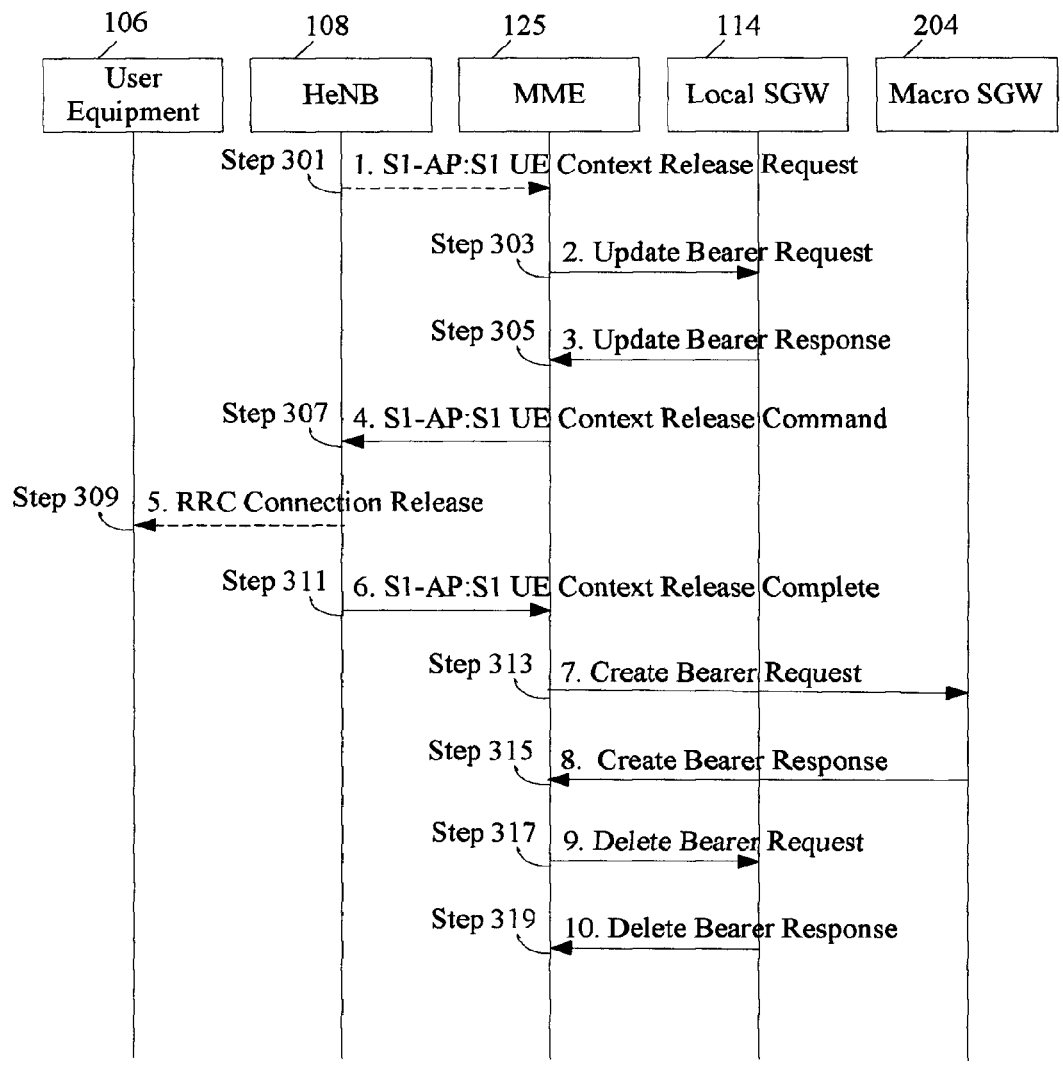
FIG. 3 is a flow diagram of a service flow for relocating a servicing gateway to a macro environment when user equipment is set to idle mode while located within an operating range of a local network, in accordance with the principles of the present invention.

According to one embodiment, the invention relocates the SGW to the macro environment from the local environment when the UE 106 is set to an idle state while operating within range of a local network 108. An exemplary process of relocating the Serving Gateway on the network is discussed with reference to FIG. 3 for an LTE network. The user equipment 106, when placed in an idle state, may initiate relocation of the SGW to the macro environment upon S1 release. A Context Release Request is routed in step S301 using a control plane signaling protocol S1 Application Part ("S1AP") between the HeNB 108 and the MME 125 to request release an S1UE context. According to one embodiment, an Update Bearer Request is routed between the MME 125 and the local SGW 114 in step S303 and an Update Bearer Response is routed between the local SGW 114 and the MME 125 in step S305.

A Context Release Command is routed in step S307 using a control plane signaling protocol S1 Application Part ("S1AP") between the MME 125 and the HeNB 108 to release an S1UE context. In step 309, the HeNB 108 directs a Radio Resource Control (RRC) connection release to the user equipment 106. In step 311, the HeNB 108 issues a Context Release Complete signal to the MME 125 using a control plane signaling protocol S1 Application Part (S1AP) to indicate release of the S1 UE context. In step 313, the MME 125 issues a Create Bearer Request to SGW 204 and in step 315 the SGW 204 issues a Create Bearer Response to the MME 125. In step 317, the MME 125 issues a Delete Bearer Request to the local SGW 114 and in step 319 the local SGW 114 issues a Delete Bearer Response to the MME 125. Upon completion of step 319, the UE 106 is relocated from local SGW 114 to macro SGW 204 when set to the idle state while operating in the in-home LAN 108.

Figure 4:
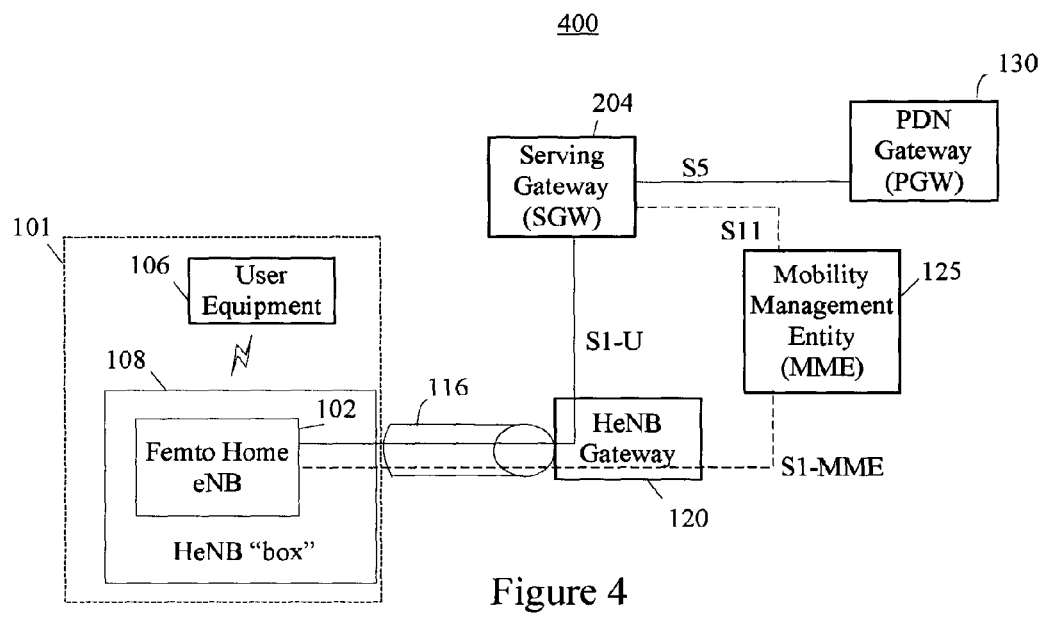
FIG. 4 is a block diagram of an in-home local IP access network architecture having an external PDN connection and an external PGW, in accordance with the principles of the present invention.

FIG. 4 is a schematic block diagram of a system designated generally as "400," for providing an external packet data network connection. The system 400 includes a UE 106 that communicates with a local area network 108 within a femto cell located inside a structure 101. The UE 106 may be assigned a local area IP address and may communicate with the in-home LAN 108. For example, the UE 106 may acquire an IP address on the LAN 108 through, for example, a dynamic host configuration protocol ("DHCP") or another address management protocol.

The system 400 enables the UE 106 to communicate with the femto base station 102, which is coupled to the Serving Gateway ("SGW") 204 on the macro network using an S1-U interface via the HeNB GW 120 and the IPsec 116. When using the external PDN connection, the system 400 uses the SGW 204 in the macro environment even when the UE 106 is operating within range of the LAN 108. The SGW 204 analyzes the data packets received from the UE 106 and determines whether to direct the received data packets to the macro PGW 130. If the UE 106 activates a local PDN connection in addition to the external PDN connection, the system 400 may relocate the Serving Gateway to local Serving Gateway in order to avoid traffic tromboning.

The SGW 204 may perform various functions, including serving as a local mobility anchor point for inter-eNB handoffs, mobility anchoring for inter-4G mobility, interception, packet routing and forwarding, transport level packet marking in the uplink and downlink, uplink and downlink per mobile terminal, PDN and quality of service class identifier ("QCI"), and accounting on user and QCI granularity for inter-operator charging, among performing other functions.

According to one embodiment, the MME 125 may be provided as a control plane entity to manage the UE 106 within the LTE network and to authenticate the UE 106. The MME 125 may be coupled to the femto base station 102 and the SGW 204. The MME 125 may manage packet forwarding uplink and downlink between the PGW 130 and the femto base station 102, among performing other functions. The MME 125 is a signaling only entity, such that IP data packets that originate from the UE 106 are not processed at the MME 125. The MME 125 may perform various functions, including non-access stratum ("NAS") signaling; NAS signaling security; tracking area list management for mobile terminals in idle and active mode; packet data network gateway ("PDN-GW") selection and Serving Gateway ("S-GW") selection; roaming; authentication; and bearer management functions; among other functions.

Figure 5:
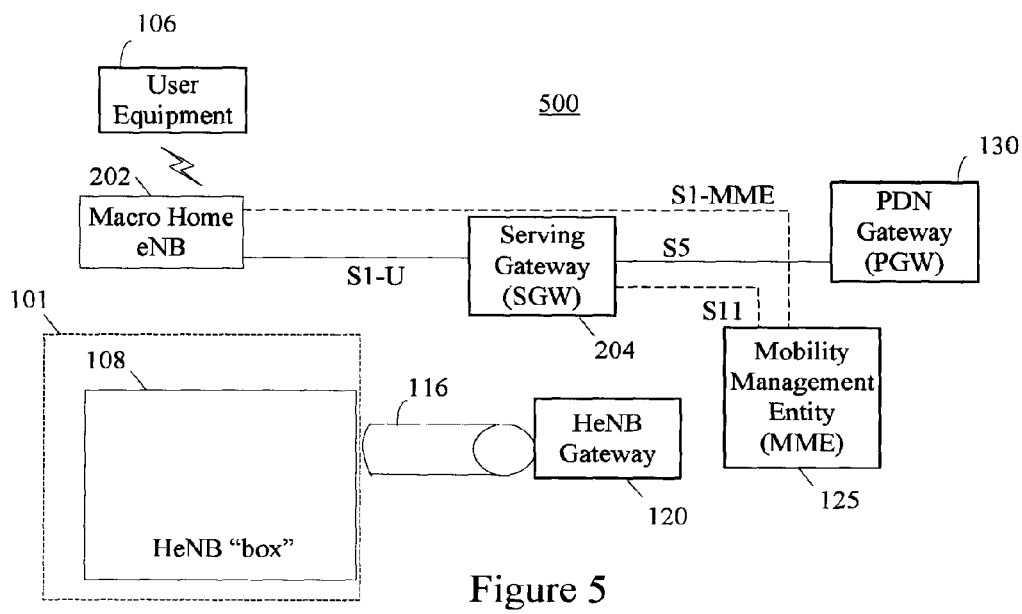
FIG. 5 is a block diagram of an away-from-home remote access architecture having an external PDN connection and an external PGW, in accordance with the principles of the present invention.

FIG. 5 is a schematic block diagram of a system designated generally as "500," for providing an external packet data network connection. The system 500 includes a UE 106, which is located at a remote location outside of a femto cell range. The UE 106 may be assigned an IP address from a remote network. For example, the UE 106 may acquire an IP address through a dynamic host configuration protocol ("DHCP") or another address management protocol.

The system 500 enables the UE 106 to communicate with the macro e-NB 202, which is coupled to the Serving Gateway ("SGW") 204 on the macro network using an S1-U interface. The SGW 204 analyzes the data packets received from the UE 106 and determines whether to direct the received data packets to the macro PGW 130. The SGW 204 may perform various functions, including being a local mobility anchor point for inter-eNB handoffs; mobility anchoring for inter-4G mobility; interception; packet routing and forwarding; transport level packet marking in the uplink and downlink; uplink and downlink per mobile terminal, PDN and quality of service class identifier ("QCI"); and accounting on user and QCI granularity for inter-operator charging; among performing other functions.

According to one embodiment, the MME 125 may be provided as a control plane entity to manage the UE 106 within the LTE network and to authenticate the UE 106. The MME 125 may be coupled to the macro e-NB 202 and the SGW 204. The MME 125 may manage packet forwarding uplink and downlink between the PGW 130 and the macro e-NB 202, among performing other functions. The MME 125 is a signaling only entity, such that IP data packets that originate from the UE 106 are not processed at the MME 125. The MME 125 may perform various functions, including non-access stratum ("NAS") signaling; NAS signaling security; tracking area list management for mobile terminals in idle and active mode; packet data network gateway ("PDN-GW") selection and Serving Gateway ("S-GW") selection; roaming; authentication; and bearer management functions; among other functions.

The systems illustrated in FIGS. 4 and 5 provide the UE 106 with external PDN connections. When the UE 106 operates in an active mode using an external PDN connection within range of the in-home LAN 108, a desired location for the Serving Gateway is within the macro cell at SGW 204, as illustrated in FIG. 4. Similarly, when the UE 106 operates in an active mode using an external PDN connection in the macro environment, a desired location for the Serving Gateway is within the macro cell at SGW 204, as illustrated in FIG. 5. For the systems of FIGS. 4 and 5 in which the UE 106 is provided with external PDN connections only, an ideal SGW location is in the macro environment, regardless of whether the UE 106 is operating within range of the in-home LAN 108 or within the macro cell.

Figure 6:
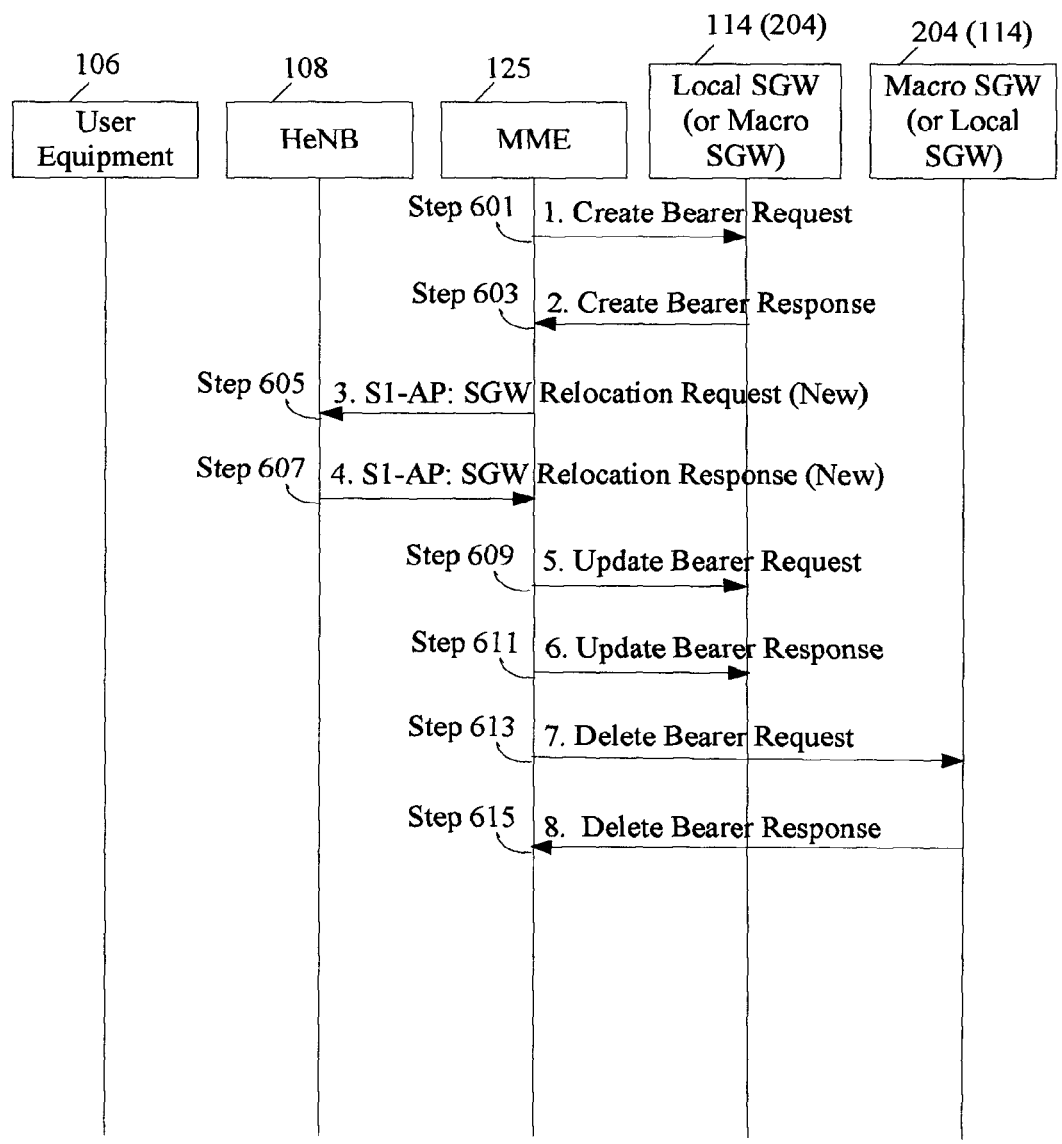
FIG. 6 is a flow diagram of a service flow for relocating a servicing gateway between a macro environment and a local environment (or vice versa) when user equipment activates or de-activates a local PDN connection while in the local environment, in accordance with the principles of the present invention.

An exemplary process of relocating the Serving Gateway between a home environment and a macro environment (and vice versa) is discussed with reference to FIG. 6 for an LTE network. The MME 125 may initiate relocation of the SGW between a home environment and a macro environment (and vice versa). In step 601, a Create Bearer Request is routed between the MME 125 and the local SGW 114 (or SGW 204). In step S603 a Create Bearer Response is routed between the local SGW 114 (or SGW 204) and the MME 125. A Relocation Request is routed in step S605 using a control plane signaling protocol S1 Application Part (S1AP) between the MME 125 and the HeNB 108 to request relocation of the SGW. A Relocation Response is routed in step S607 using a control plane signaling protocol S1 Application Part (S1AP) between the HeNB 108 and the MME 125 to relocate the SGW. In step 609, the MME 125 issues an Update Bearer Request signal to the local SGW 114 (or SGW 204). In step 611, the local SGW 114 (or SGW 204) issues an Update Bearer Response signal to the MME 125. In step 613, the MME 125 issues a Delete Bearer Request to SGW 204 (or local SGW 114) and in step 615 the SGW 204 (or local SGW 114) issues a Delete Bearer Response to the MME 125. Upon completion of step 615, the local SGW 114 (or SGW 114) is relocated to the SGW 114 (or local SGW 114) when the UE 106 is operating in the active state and the local PDN connection is de-activated (or the local PDN connection is activated).

Figure 7:
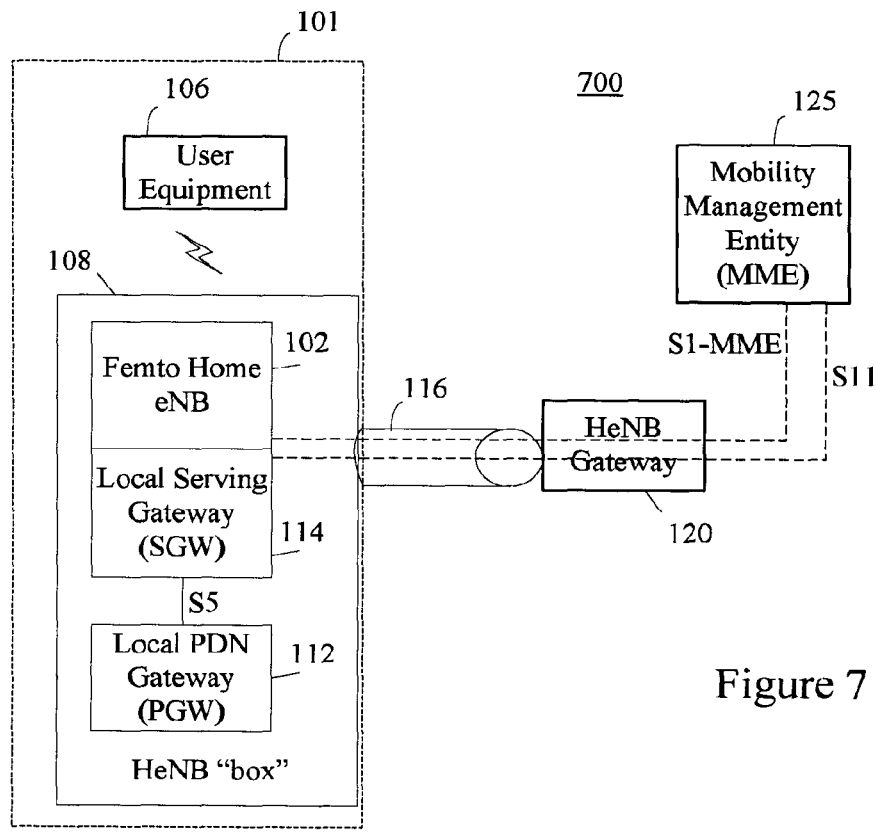
FIG. 7 is a block diagram of an in-home local IP access network architecture having a local PDN connection and an local PGW, in accordance with the principles of the present invention.

FIG. 7 is a schematic block diagram of a system designated generally as "700," for providing a local packet data network connection. The system 700 includes a UE 106 that communicates with a local area network 108 within a femto cell located inside a structure 101. The UE 106 may be assigned a local area IP address and may communicate with the in-home LAN 108. For example, the UE 106 may acquire an IP address on the LAN 108 through, for example, a dynamic host configuration protocol ("DHCP") or another address management protocol.

The system 700 enables the UE 106 to communicate with the femto base station 102, which is coupled to the local SGW 114 and the local PGW 112 on the local network 108. The local PGW 112 provides the UE 106 with direct connectivity to the backhaul IP infrastructure using the femto base station 102 and the home LAN 108. The femto base station 102, the local PGW 112 and the local SGW 114 may be configured to enable the UE 106 to access one or more packet data networks ("PDN") concurrently through one or more local PGWs 112.

The femto base station 102 supports the S5 and S11 interface, among other interfaces. The local PGW 112 and the local SGW 114 communicate using the S5 interface. The femto gateway ("HeNB GW") 120, in addition to aggregating the S1-MME interface, also may be enhanced to support S11 and S5 aggregation.

The femto base station 102 may be coupled to the HeNB GW 120 through IPsec tunnel 116. IPsec tunnel 116 provides a secure public network connection and prevents wiretapping, traffic manipulation or other security threats. The HeNB GW 120 is an interface to external networks and may be coupled to a plurality of femto base stations 102. For example, the HeNB GW 120 may be coupled to and may manage hundreds or thousands of femto base stations 102. Additionally, the HeNB GW 120 may be configured as an authenticator that grants local breakout authorization.

According to one embodiment, the MME 125 may be provided as a control plane entity to manage the UE 106 within the LTE network and to authenticate the UE 106. The MME 125 may be coupled to the femto base station 102 and the local SGW 114. The MME 125 is a signaling only entity, such that IP data packets that originate from the UE 106 are not processed at the MME 125. The MME 125 may perform various functions, including non-access stratum ("NAS") signaling; NAS signaling security; tracking area list management for mobile terminals in idle and active mode; packet data network gateway ("PDN-GW") selection and Serving Gateway ("S-GW") selection; roaming; authentication; and bearer management functions; among other functions.

Figure 8:
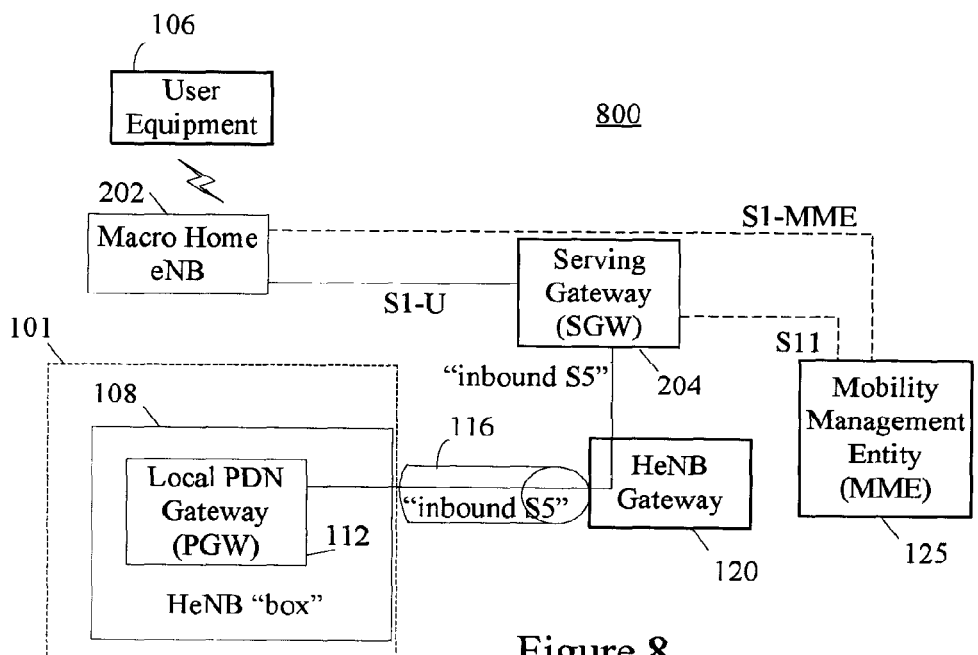
FIG. 8 is a block diagram of an away-from-home remote access architecture having a local PDN connection and a local PGW, in accordance with the principles of the present invention.

FIG. 8 illustrates a schematic block diagram of a system designated generally as "800," for providing an local packet data network connection. The system 800 includes a UE 106, which is located at a remote location outside of a femto cell range. The UE 106 may be assigned an IP address from a remote network. For example, the UE 106 may acquire an IP address through a dynamic host configuration protocol ("DHCP") or another address management protocol.

The system 800 enables the UE 106 to communicate with the macro e-NB 202, which is coupled to the Serving Gateway ("SGW") 204 on the macro network using an S1-U interface. The SGW 204 analyzes the data packets received from the UE 106 and determines whether to direct the received data packets to the local PGW 112. The SGW 204 may perform various functions, including being a local mobility anchor point for inter-eNB handoffs; mobility anchoring for inter-4G mobility; interception; packet routing and forwarding; transport level packet marking in the uplink and downlink; uplink and downlink per mobile terminal, PDN and quality of service class identifier ("QCI"); and accounting on user and QCI granularity for inter-operator charging; among performing other functions.

According to one embodiment, the MME 125 may be provided as a control plane entity to manage the UE 106 within the LTE network and to authenticate the UE 106. The MME 125 may be coupled to the macro e-NB 202 and the SGW 204. The MME 125 may manage packet forwarding uplink and downlink between the local PGW 112 and the macro e-NB 202, among performing other functions. The MME 125 is a signaling only entity, such that IP data packets that originate from the UE 106 are not processed at the MME 125. The MME 125 may perform various functions, including non-access stratum ("NAS") signaling; NAS signaling security; tracking area list management for mobile terminals in idle and active mode; packet data network gateway ("PDN-GW") selection and Serving Gateway ("S-GW") selection; roaming; authentication; and bearer management functions; among other functions.

The systems illustrated in FIGS. 7 and 8 provide the UE 106 with local PDN connections. When the UE 106 operates in an active mode using a local PDN connection within range of the in-home LAN 108, a desired location for the Serving Gateway is within the femto base station 102 at local SGW 114, as illustrated in FIG. 7. By contrast, when the UE 106 operates in an active mode in the macro environment using a local PDN connection, a desired location for the Serving Gateway is within the macro cell at SGW 204, as illustrated in FIG. 8. For the systems of FIGS. 7 and 8 in which the UE 106 is provided with local PDN connections only, a desired SGW location is in the local environment while operating within range of the in-home LAN 108 and in the macro environment while operating within the macro cell.

It should be appreciated that, although the invention is described with reference to the LTE network, the principles of the invention may be adapted by one of skill in the art to migrate between any networks, including other networks, such as 1xRTT networks, EV-DO networks, UMTS networks, WiMAX (802.16) networks, other CDMA2000 networks and any other networks known in the art or later developed.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention. It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The invention claimed is:

1. A computer system, comprising:
   one or more processors;
   one or more memories coupled to the one or more processors, the one or more memories having program instructions stored thereon that are executable to cause computer system to:
   configure communication for a user equipment device (UE) to communicate via a local radio access network;
   configure communication for the UE to communicate via a macro radio access network;

determine a status mode of the UE and a location of the UE; and select a serving gateway (SGW) for the UE from among an available local SGW and an available macro SGW for the UE based on the status mode and the location.

2. The computer system of claim 1, wherein the status mode is one of an active mode or an idle mode.

3. The computer system of claim 1, wherein the program instructions are executable to:

select the available macro SGW for the UE in response to determining that the UE is located in range of the local radio access network and is in an idle mode.

4. The computer system of claim 3, wherein, to select the available macro SGW for the UE, the program instructions are executable to transmit an update bearer request to the available local SGW and transmit a create bearer request to the available macro SGW.

5. The computer system of claim 3, wherein the program instructions are executable to select the available macro SGW for the UE in response to a context release request from the UE.

6. The computer system of claim 1, wherein the program instructions are executable to:

select the available local SGW for the UE in response to determining that a local packet data network connection has been activated for the UE.

7. The computer system of claim 1, wherein the computer system is communicatively coupled to the available local SGW, the available macro SGW, a base station for the local radio access network, and a base station for the macro radio access network.

8. The computer system of claim 1, wherein the computer system is communicatively coupled to a local gateway, wherein the local gateway is configured to receive data packets from the local radio access network and route the data packets to the selected one of the available local SGW or the available macro SGW.

9. The computer system of claim 1, wherein the computer system is a mobility management entity (MME).

10. A method, comprising:

configuring, by a computing system, communication for a user equipment device (UE) to communicate via a local radio access network;

configuring, by the computing system, communication for the UE device to communicate via a macro radio access network;

determining, by the computing system, a status mode of the UE and a location of the UE; and selecting, by the computing system, a serving gateway (SGW) for the UE from among an available local serving gateway (SGW) and an available macro SGW for the UE based on the status mode and the location.

11. The method of claim 10, further comprising:

selecting, by the computing system, the available macro SGW in response to determining that the UE is located within range of the local radio access network and is in an idle mode.

12. The method of claim 11, wherein the selecting the available macro SGW includes transmitting a create bearer request to the available macro SGW.

13. The method of claim 10, wherein the status mode is selected from the group consisting of an idle mode and an active mode.

14. The method of claim 10, wherein the selecting the one of the available local SGW or the available macro SGW is further based on whether a local packet data network (PDN) connection is active.

15. An apparatus, comprising:

one or more processors configured to control at least one radio to perform voice and/or data communications using at least one radio access technology (RAT), including to:

communicate via one of a local radio access network (RAN) or a macro RAN using an available local serving gateway (SGW) based on operating in a first status mode at a particular location; and communicate via one of the local RAN or the macro RAN using an available macro SGW based on operating in a second status mode at the particular location.

16. The apparatus of claim 15, wherein the particular location is within range of the local RAN, the first status mode is an active mode, and the second status mode is an idle mode.

17. The apparatus of claim 15, wherein the UE is further configured to: initiate a switch from the available local SGW to the available macro SGW using a context release request.

18. The apparatus claim 15, wherein the apparatus is configured to communicate using the available macro SGW or the available local SGW based on information received from a mobility management entity (MME).

19. The apparatus of claim 15, wherein the first and second status modes are selected from the group consisting of: an active mode and an idle mode.

20. The apparatus of claim 15, further comprising: the at least one radio; and at least one antenna.

* * * * *